United States Patent [19]

Burke et al.

[11] Patent Number: 5,388,553
[45] Date of Patent: Feb. 14, 1995

[54] STARTING FLUID INJECTION SYSTEM

[75] Inventors: James O. Burke, Crystal Lake; Dean R. Solberg, Mundelein, both of Ill.

[73] Assignee: Kold Ban International, Ltd., Algonquin, Ill.

[21] Appl. No.: 986,157

[22] Filed: Dec. 4, 1992

[51] Int. Cl.$^6$ .................................................. F02N 17/08
[52] U.S. Cl. .................................................. 123/179.8
[58] Field of Search ........... 123/179.8, 179.12, 179.13, 123/179.14, 179.15, 179.9, 179.7

[56] References Cited

U.S. PATENT DOCUMENTS

| | | | |
|---|---|---|---|
| 2,402,964 | 7/1946 | Hoffstrom | 123/179.14 |
| 3,750,639 | 8/1973 | DiGirolamo | 123/179.13 |
| 4,928,642 | 5/1990 | Atkinson et al. | 123/179.7 |

FOREIGN PATENT DOCUMENTS 55-109753  8/1980  Japan .................................. 123/179.8

*Primary Examiner*—Andrew M. Dolinar
*Attorney, Agent, or Firm*—Willian Brinks Hofer Gilson & Lione

[57] ABSTRACT

A starting fluid injection system for an internal combustion engine includes a first valve mounted adjacent a starting fluid canister to release starting fluid from the canister, a nozzle mounted to inject staring fluid into an internal combustion engine, a conduit connected between the first valve and the nozzle to conduct starting fluid from the canister to the nozzle, and a second valve positioned downstream of the first valve immediately adjacent the nozzle. The second valve is remotely actuatable to stop starting fluid injection by the nozzle promptly on command, and the second valve eliminates undesired flow of starting fluid into the engine in the event the engine speed falls below a preset threshold.

12 Claims, 2 Drawing Sheets

Microfiche Appendix Included
(1 Microfiche, 34 Pages)

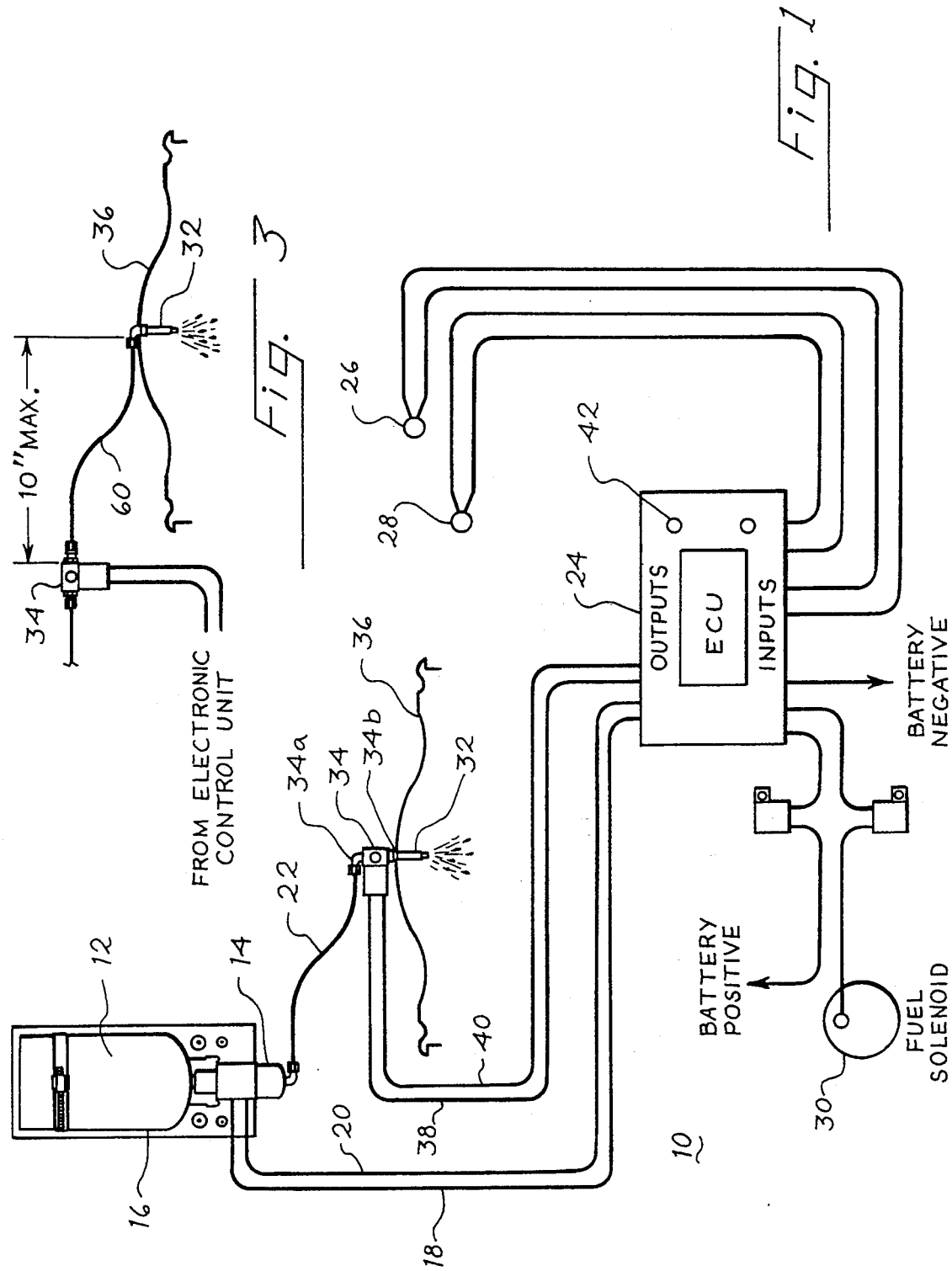

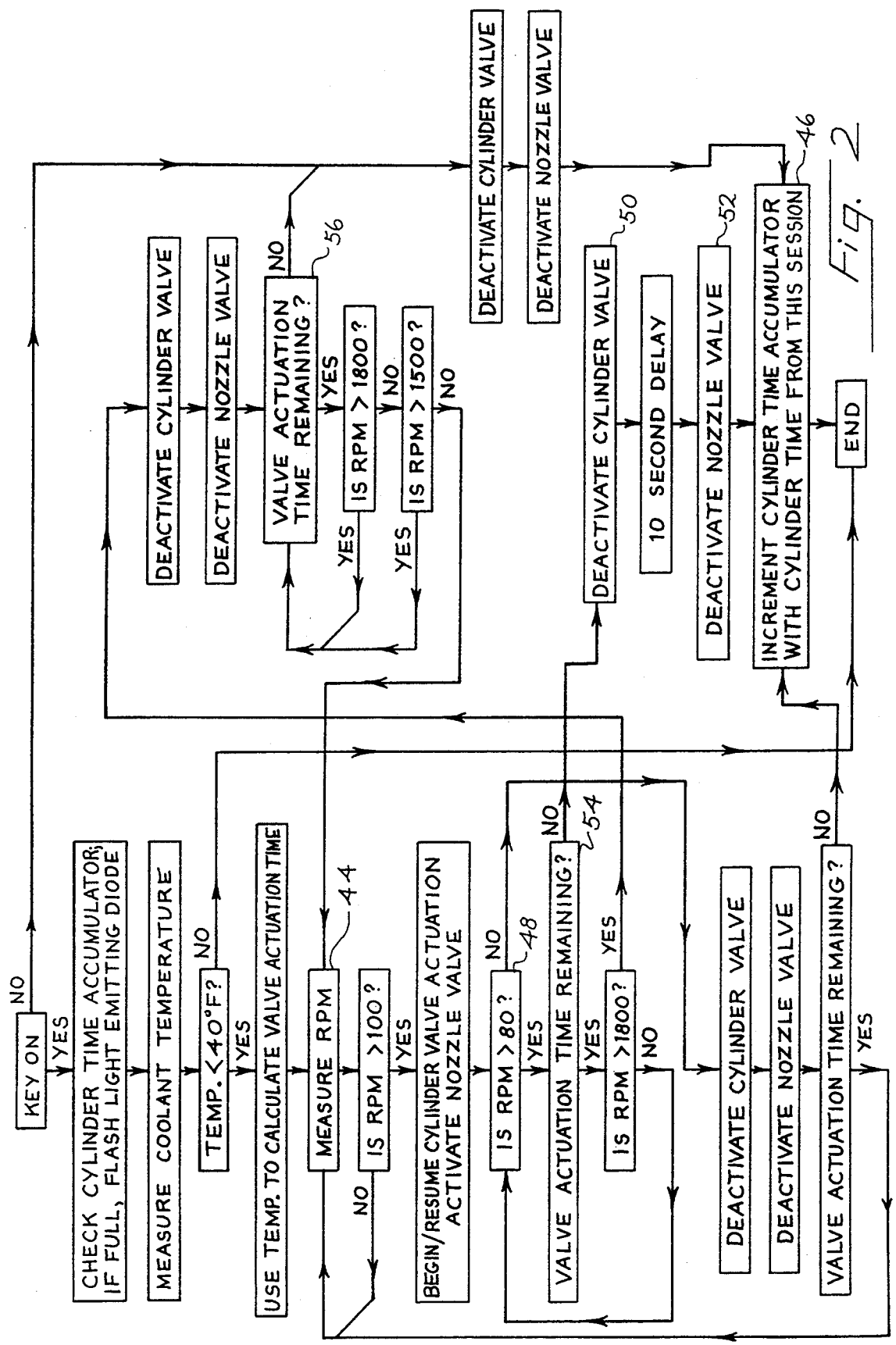

STARTING FLUID INJECTION SYSTEM

REFERENCE TO MICROFICHE APPENDIX

This specification includes a microfiche appendix made up of one microfiche containing 34 frames. This appendix includes copyrighted material. The patent owner has no objection to the facsimile reproduction of this appendix, but reserves all other rights whatsoever.

BACKGROUND OF THE INVENTION

This invention relates to starting fluid injection systems for internal combustion engines, and in particular to improvements to such systems which will enable them to operate more reliably on a wider range of engines.

High compression, indirect injection diesel engines are susceptible to a phenomenon known as "ether lock-up". When starting fluid is injected into such an engine and the engine fails to start, on occasion the concentration of starting fluid in the combustion chambers of the engine can reach an excessive level which causes preignition of the starting fluid. When this happens, the engine can be virtually impossible to start until the excess starting fluid has been cleared from the engine.

Excess starting fluid can enter the engine when a starting fluid injection system is allowed to continue to inject starting fluid even though the engine is not running. In the typical starting fluid injection system, a valve actuator is mounted adjacent the starting fluid canister, and this valve actuator is operated to stop starting fluid from flowing out of the canister when the engine fails to start as it is cranked. However, because the typical canister valve is located at a considerable distance from the injection nozzle, the volume of the injection system between the nozzle and the valve is relatively large, and this volume allows an undesirably large quantity of starting fluid to pass into the engine after the canister valve has been closed.

In the past, the problem of ether lock-up has limited the use of starting fluid injection systems in diesel engines of the type described above. It would be an advance in the art if a starting fluid system could be made to operate reliably on such diesel engines with little or no ether lock-up.

SUMMARY OF THE INVENTION

According to a first aspect of this invention, a starting fluid injection system of the type comprising a first valve operative to release starting fluid from a canister, a nozzle operative to inject starting fluid into an internal combustion engine, and a conduit connected between the first valve and the nozzle to conduct starting fluid released from the canister by the first valve to the nozzle is further provided with a second valve positioned downstream of the first valve and remotely actuatable to stop starting fluid injection by the nozzle. Preferably, the second valve is positioned sufficiently close to the nozzle such that no more than about one milliliter of starting fluid (more preferably no more than one-half ml) can escape from the nozzle after the second valve closes.

According to a second aspect of this invention, a starting fluid injection system of the type comprising a nozzle operative to inject starting fluid into an internal combustion engine and a conduit connectable to a source of starting fluid to supply starting fluid to the nozzle for injection is further provided with a remotely actuatable valve positioned closely adjacent to the nozzle to selectively stop starting fluid injection at the nozzle.

According to a third aspect of this invention, a starting fluid injector assembly is provided which comprises a remotely actuatable, continuous duty flow control valve having an inlet and an outlet, a starting fluid injection nozzle connected to the outlet of the valve, and a mounting arrangement that secures the valve to the nozzle to form a rigid, modular unit. This arrangement allows the nozzle valve to be positioned immediately adjacent to the injector nozzle, thereby minimizing the flow of starting fluid into the engine once the nozzle valve has closed.

According to a fourth aspect of this invention, a method is provided for injecting starting fluid into an internal combustion engine. This method includes the step of providing a starting fluid injection system on an internal combustion engine, this system comprising a nozzle operative to inject starting fluid into the internal combustion engine, a conduit connected to a source of starting fluid to supply starting fluid to the nozzle for injection, and a remotely actuatable valve positioned closely adjacent to the nozzle to selectively stop the flow of starting fluid to the nozzle. The method includes the further steps of cranking the engine while maintaining the valve open to inject starting fluid into the engine, monitoring engine speed, and closing the valve promptly to stop starting fluid injection when engine speed satisfies selected criteria indicative of excessively slow engine speed. Preferably, the valve is positioned sufficiently close to the nozzle such that no more than about one milliliter of starting fluid escapes from the nozzle after the valve closes. By incorporating a valve closely adjacent to the point of starting fluid injection, the flow of starting fluid into the engine after the valve has been closed can be terminated immediately on command.

The preferred method and apparatus described below have proven effective in eliminating the undesired effects of ether lock-up. This system can readily be operated by untrained personnel to provide dependable starting for such engines under most or all circumstances.

The invention itself, together with further objects and attendant advantages, will best be understood by reference to the following detailed description, taken in conjunction with the accompanying drawings.

BRIEF DESCRIPTION OF THE DRAWINGS

FIG. 1 is a block diagram of a starting fluid injection system which incorporates a first preferred embodiment of this invention.

FIG. 2 is a flow chart illustrating the operation of the electronic control unit of FIG. 1.

FIG. 3 is a somewhat schematic diagram of an alternate arrangement for the nozzle valve of the embodiment of FIG. 1.

DETAILED DESCRIPTION OF THE PRESENTLY PREFERRED EMBODIMENTS

Turning now to the drawings, FIG. 1 shows a block diagram of at first preferred embodiment 10 of the starting fluid injection system of this invention. This system has been designed to operate reliably on a General Motors 6.2 liter indirect injection diesel engine. Of course, many of the details of operation described below are specific to that application, and they can readily be altered by those skilled in the art as suitable for other internal combustion engines.

The system 10 includes a canister 12 that contains a pressurized starting fluid such as an ether based starting fluid. The canister 12 (sometimes referred to as a cylinder in the following discussion) includes a mechanical valve at its lower end, which end is connected to a solenoid valve actuator. The combination of the solenoid valve actuator and the mechanical valve of the canister 12 will on occasion be referred to as the canister valve 14 in the following discussion. The solenoid valve actuator is an on/off actuator that can be configured as shown in U.S. Pat. No. 4,202,309, assigned to the assignee of the present invention. The solenoid valve actuator 14 is mounted on a bracket 16 that is adapted for mounting at any convenient location, typically in the engine compartment of a vehicle.

The valve actuator 14 is actuated by electrical signals appearing on conductors 18, 20, and the valve actuator 14 in its inactive state allows the mechanical valve in the canister 12 to remain closed, thereby containing starting fluid within the canister 12. When a suitable voltage difference is supplied between the conductors 18, 20 the valve actuator 14 opens the mechanical valve of the canister 12, thereby allowing starting fluid to pass through the canister valve 14 into a conduit 22.

The canister valve 14 is controlled by an electronic control unit (ECU) 24. The ECU receives inputs from an engine temperature sensor 26 and an engine speed sensor 28. The ECU 24 is also connected to the positive and negative terminals of the battery (not shown) of the vehicle and to the fuel solenoid 30. As described below in greater detail, the ECU 24 monitors the inputs from the fuel solenoid 30 and the sensors 26, 28 and applies signals to the conductors 18, 20 to open the canister valve 14 and thereby admit starting fluid into the conduit 22 when the engine is being started at low temperatures.

As shown in FIG. 1, the conduit 22 is connected to a starting fluid injection nozzle 32 via a nozzle valve 34. In FIG. 1, the inlet of the valve 34 is indicated at 34a and the outlet is indicated at 34b. The nozzle 32 in this embodiment is mounted on the air cleaner 36 of the internal combustion engine, and the nozzle 34 is positioned to inject starting fluid into the incoming air after it is passed through the filter elements of the air cleaner.

The nozzle valve 34 in this embodiment is a small, lightweight spool valve which is electromagnetically operated and controlled by the ECU via signals supplied to conductors 38, 40. In contrast to the canister valve actuator, the nozzle valve 34 is a flow control valve rather than a solenoid for operating a mechanical canister valve. In general terms, the ECU controls the valve 14 to control the dispensing of starting fluid out of the canister 12, and the ECU controls the nozzle valve 34 to ensure that the injection of starting fluid is terminated promptly under certain conditions as described below.

FIG. 2 provides a flow chart that illustrates the basic operation of the ECU 24. As shown in the upper left-hand corner, the program executed by the ECU 24 first waits for the ignition to be turned on by the operator. This is done by monitoring the voltage on the fuel solenoid 30.

When the ignition is on, the program then checks the cylinder time accumulator to determine whether there is adequate starting fluid in the canister 12. The cylinder time accumulator is a register that stores a number indicative of the total volume of starting fluid that has been dispensed from the canister 12 by the valve 14. Since the starting volume for the canister 12 is known, the cylinder time accumulator is used as an indicator of a low starting fluid level in the canister 12. If the starting fluid level is excessively low, a light emitting diode 42 is flashed.

The program then measures engine coolant temperature by means of the engine temperature sensor 26. If the engine coolant temperature is greater than or equal to 40° F., the program terminates without commanding any injection of starting fluid into the engine.

In the event the engine coolant temperatures is less than 40° F., the program calculates a desired valve actuation time appropriate for the measured coolant temperature. Generally speaking, lower temperatures require longer valve actuation times for proper starting of the engine. Various approaches including formulas and look-up tables can be used to determine the valve actuation time, which should be determined for each engine as appropriate for the starting requirements of that engine.

Once the desired valve actuation time has been determined, the program then measures engine speed via the engine speed sensor 28 and waits until engine speed exceeds 100 RPM. At this point, the program causes the ECU 24 to apply voltages to the conductors 18, 20, 38, 40, that command both the canister valve 14 and the nozzle valve 34 open. The program then monitors engine speed. In the event engine speed falls below 80 RPM (indicating that the engine has failed to start and the cranking speed has slowed), the program deactivates both the cylinder valve 14 and the nozzle valve 34 and branches depending upon whether any of the initially determined desired valve actuation time remains. If so, the program returns to measure engine speed in block 44. If not, the program branches to block 46 to increment the cylinder time accumulator with the cylinder time from this session and then to terminate operation.

Returning to block 48, assuming engine speed exceeds 80 RPM, the program checks to determine whether any valve actuation time is remaining. If not, the program deactivates the cylinder valve 14 in block 50, waits for 10 seconds, and then deactivates the nozzle valve 34 in block 52. This 10 second delay allows starting fluid in the conduit 22 to be injected into the engine via the nozzle 32 before the nozzle valve 34 is closed. Then the cylinder time accumulator is incremented and the program terminates.

Returning to block 54, in the event that valve actuation time remains, the program then checks whether or not engine speed exceeds 1800 RPM. If not, control is returned to block 58. If the engine speed exceeds 1800 RPM, this is taken as an indication that the engine has started properly and the valves 14, 34 are closed. Then the program checks in block 56 to determine whether any valve actuation time remains. If not, the two valves 14, 34 are closed and the program terminates. If so, engine speed is checked, and the program loops as long as engine speed is greater than 1800 RPM. However, if engine speed falls below 1500 RPM and valve actuation time remains, control is returned to block 44.

Several features of the flow chart of FIG. 2 should be emphasized. First, in the event engine speed falls below 80 RPM in block 48, the cylinder valve 14 and the nozzle valve 34 are both immediately closed. Because the nozzle valve 34 is positioned closely adjacent to the nozzle 32, closing the nozzle valve 34 shuts off the flow of starting fluid into the engine immediately. In this way, the excessive accumulation of starting fluid in the engine is reduced or prevented, and ether lock-up is avoided in many or all cases.

Second, in the event that no valve actuation time remains at block 34, the cylinder valve 14 is closed in block 50, but the nozzle valve 34 is not closed in block 52 until after a 10 second delay. This allows substantially all of the starting fluid that has been released from the canister 12 to pass via the nozzle valve 34 and the nozzle 32 into the engine.

In order better to define the presently preferred embodiment of this invention, the microfiche appendix provides a detailed schematic diagram of the circuitry of the ECU 24. This circuitry includes a microprocessor as illustrated, which in this embodiment is an Intel 8086 microprocessor or equivalent. The program flow charted in FIG. 2 is listed in its entirety in the microfiche appendix.

Simply by way of example, the nozzle valve 34 can be a solenoid actuated valve (normally closed) of the type distributed by MAC as part no. 35A-AAA-DDBA-1BA. This is a standard solenoid valve that has been provided with Teflon (TM) seals to resist ether-based starting fluids. It should be noted that the valve 34 is preferably a continuous duty valve which can remain open for extended time periods without damage to the valve or degradation of its performance. In this context, the term "continuous duty" is intended to refer to a valve that is capable of remaining open continuously for more than 15 seconds without adverse effects on its operation.

In this preferred embodiment, the engine speed sensor 28 comprises a tachometer sensor such as that supplied by AC Delco as Part No. 7849303 that supplies four pulses per engine revolution. Alternate embodiments can utilize magnetic pickups or the direct pulsing current of the alternator of the vehicle. In this embodiment, the engine temperature sensor comprises a thermistor, such as that supplied by AC Delco as Part No. 25036979.

FIG. 3 shows an alternate arrangement for the nozzle valve 34 and the nozzle 32. In this embodiment, a conduit 60 is interposed between the valve 34 and the nozzle 32. This conduit is preferably no more than 10 inches in length, and this approach allows somewhat more flexible mounting of the valve 34. This is in contrast to the arrangement shown in FIG. 1, where the nozzle 32 is screwed directly to the outlet 34a of the valve 34 such that the nozzle 32 and the valve 34 form a rigid, modular unit.

As described above, the system 10 operates to interrupt the injection of starting fluid into the engine promptly when engine speed falls below a preset threshold. Because the valve 34 is positioned closely adjacent to the nozzle 32, no substantial volume of starting fluid enters the engine after the valve 34 closes. As pointed out above, the valve 34 can be mounted either directly on the nozzle 32 or it can be coupled to the nozzle 32 by a relatively short conduit 60. In any case, it is preferred that the total volume of starting fluid that can be injected into the engine by the nozzle 32 after the valve 34 closes is preferably less than 1 ml and more preferably less than one-half ml.

Of course, it should be understood that a wide range of changes and modifications can be made to the preferred embodiments described above.

We claim:

1. A method for injecting starting fluid into an internal combustion engine comprising the following steps:
   a) providing a starting fluid injection system on an internal combustion engine, said system comprising a nozzle operative to inject starting fluid into the internal combustion engine, a conduit connected to a source of starting fluid to supply starting fluid to the nozzle for injection, and a remotely actuatable valve positioned closely adjacent to the nozzle to selectively stop the flow of starting fluid to the nozzle, said source of starting fluid comprising a canister and a canister valve;
   b) cranking the engine while maintaining the remotely actuatable valve open to inject starting fluid into the engine;
   c) monitoring engine speed;
   d) closing the remotely actuatable valve promptly to stop starting fluid injection when engine speed satisfies selected criteria indicative of excessively slow engine speed; and
   e) closing the canister valve.

2. The method of claim 1 wherein step a) comprises the step of providing the remotely actuatable valve and the nozzle as a modular unit.

3. The method of claim 1 wherein step a) comprises the step of positioning the remotely actuatable valve such that the remotely actuatable valve is separated from the nozzle by no more than about 10 inches.

4. The method of claim 1 wherein step a, comprises the step of positioning the remotely actuatable valve sufficiently close to the nozzle such that no more than about 1 ml of starting fluid can escape from the nozzle after the remotely actuatable valve closes.

5. The method of claim 1 wherein step a) comprises the step of positioning the remotely actuatable valve sufficiently close to the nozzle such that no more than about one-half ml of starting fluid can escape from the nozzle after the remotely actuatable valve closes.

6. A method for injecting starting fluid into an internal combustion engine comprising the following steps:
   a) providing a starting fluid injection system on an internal combustion engine, said system comprising a nozzle operative to inject starting fluid into the internal combustion engine, a conduit connected to a source of starting fluid to supply starting fluid to the nozzle for injection, a remotely actuatable first valve positioned closely adjacent to the nozzle to selectively stop the flow of starting fluid to the nozzle, and a second valve positioned between the source of starting fluid and the first valve to selectively stop the flow of starting fluid from the source;
   b) cranking the engine while maintaining the first and second valves open to inject starting fluid into the engine;
   c) monitoring engine speed; and
   d) closing the first valve promptly to stop starting fluid injection when engine speed satisfies selected criteria indicative of excessively slow engine speed; wherein step a) comprises the step of positioning the first valve sufficiently close to the nozzle such that no more than about 1 ml of starting fluid can escape from the nozzle after the first valve closes.

7. A system for injecting starting fluid into an internal combustion engine, said system comprising:
- a nozzle operative to inject starting fluid into the internal combustion engine;
- a source of starting fluid comprising a canister and a canister valve;
- a conduit connected between the source of starting fluid and the nozzle to supply starting fluid to the nozzle for injection;
- a remotely actuatable valve positioned closely adjacent to the nozzle to selectively stop the flow of starting fluid to the nozzle;
- means for maintaining the remotely actuatable valve open to inject starting fluid into the engine during cranking;
- means for closing the remotely actuatable valve promptly to stop starting fluid injection when engine speed satisfies selected criteria indicative of excessively slow engine speed; and
- means for closing the canister valve.

8. The invention of claim 7 wherein the remotely actuatable valve and the nozzle together comprise a modular unit.

9. The invention of claim 7 wherein the remotely actuatable valve and the nozzle are separated by no more than about 10 inches.

10. The invention of claim 7 wherein the remotely actuatable valve is positioned sufficiently close to the nozzle that no more than about 1 ml of starting fluid can escape from the nozzle after the remotely actuatable valve closes.

11. The invention of claim 7 wherein the remotely actuatable valve is positioned sufficiently close to the nozzle that no more than about ½ ml of starting fluid can escape from the nozzle after the remotely actuatable valve closes.

12. A system for injecting starting fluid into an internal combustion engine, said system comprising:
- a nozzle operative to inject starting fluid into the internal combustion engine;
- a source of starting fluid;
- a conduit connected between the source of starting fluid and the nozzle to supply starting fluid to the nozzle for injection;
- a remotely actuatable first valve positioned closely adjacent to the nozzle to selectively stop the flow of starting fluid to the nozzle;
- a second valve positioned between the source of starting fluid and the first valve to selectively stop the flow of starting fluid from the source;
- means for maintaining the remotely actuatable valve open to inject starting fluid into the engine during cranking; and
- means for closing the remotely actuatable valve promptly to stop starting fluid injection when engine speed satisfies selected criteria indicative of excessively slow engine speed;
- wherein the first valve is positioned sufficiently close to the nozzle such that no more than about 1 ml of starting fluid can escape from the nozzle after the first valve closes.

* * * * *